Sept. 9, 1924.
M. R. KARGE ET AL
1,507,921
FLEXIBLE COUPLING
Filed Nov. 27, 1920      2 Sheets-Sheet 1
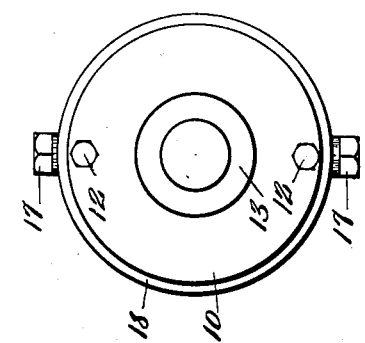
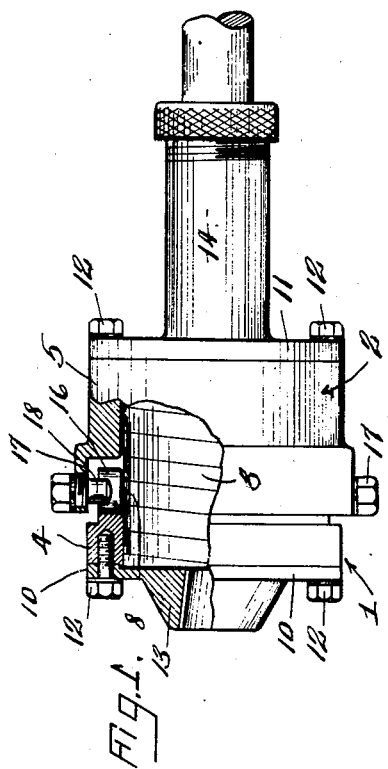
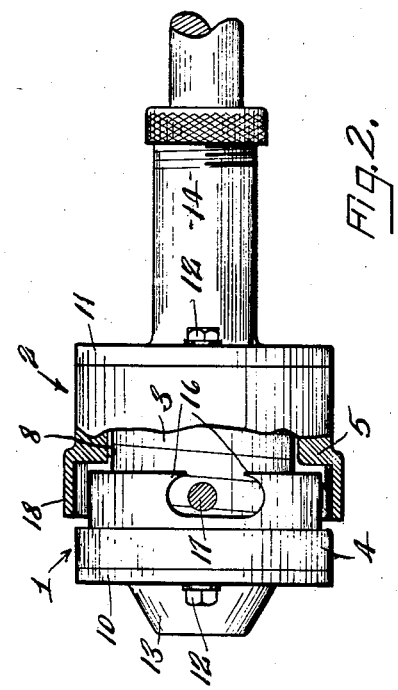
Maxwell R. Karge and Ferman O'Conill INVENTORS.
BY
Parsons & Bodell ATTORNEYS.

Sept. 9, 1924.
M. R. KARGE ET AL
1,507,921
FLEXIBLE COUPLING
Filed Nov. 27, 1920     2 Sheets-Sheet 2
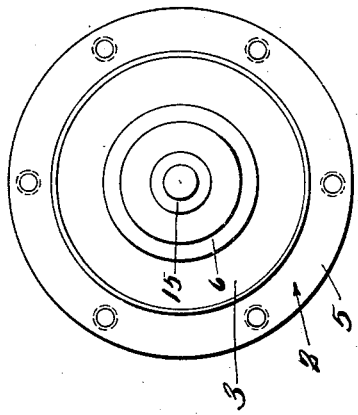
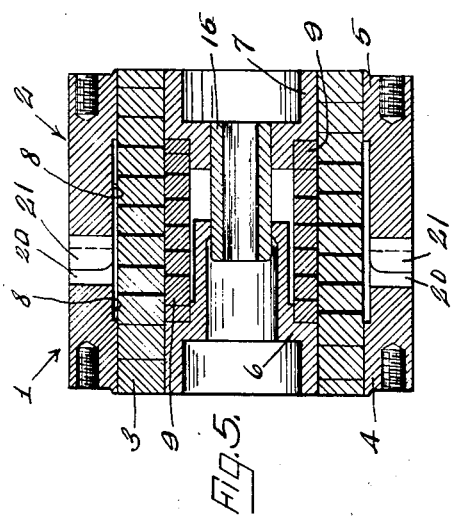
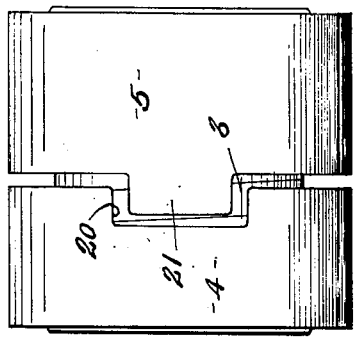
INVENTORS.
BY
ATTORNEYS.

Patented Sept. 9, 1924.

1,507,921

UNITED STATES PATENT OFFICE.

MAXWELL R. KARGE AND FERNAN O. CONILL, OF PHOENIX, NEW YORK.

FLEXIBLE COUPLING.

Application filed November 27, 1920. Serial No. 426,842.

*To all whom it may concern:*

Be it known that we, MAXWELL R. KARGE and FERNAN O. CONILL, citizens of the United States, and the Republic of Cuba, respectively, and residents of Phoenix, in the county of Oswego and State of New York, have invented a certain new and useful Flexible Coupling, of which the following is a specification.

This invention relates to flexible couplings, or universal joints, of the type described in the pending applications of Maxwell R. Karge, Sr. No. 273,548, filed Jan. 28, 1919; Sr. No. 285,762, filed March 28, 1919; Sr. No. 364,712, filed March 10, 1920; Sr. No. 364,713, filed March 10, 1920; Sr. No. 391,067, filed June 23, 1920; Sr. No. 391,068, filed June 23, 1920; and Sr. No. 391,069, filed June 23, 1920; and has for its object a particularly simple and efficient means for limiting the tensioning of the spring in addition to the binding action of the spring and thus making the coupling unbreakable should the torque be increased beyond the amount for which the coupling is designed. The invention consists in the novel features and in the combinations and constructions hereinafter set forth and claimed.

In describing this invention, reference is had to the accompanying drawings in which like characters designate corresponding parts in all the views.

Figure 1 is a side elevation, partly in section of one form of this coupling.

Figure 2 is a similar elevation, partly in section, looking downwardly in Fig. 1.

Figure 3 is an end view looking to the left in Fig. 1.

Figure 4 is an elevation of a coupling embodying another form of our invention, the end plates of the headers being omitted.

Figure 5 is a longitudinal sectional view taken centrally of Fig. 4.

Figure 6 is an end view looking to the left in Fig. 4.

This flexible coupling or universal joint comprises generally, a pair of headers, a coiled torsion spring fixed at its ends to the headers respectively, the headers being normally arranged to have movement relatively to each other during tensioning of the spring and being provided with means for interlocking and positively connecting them together whereby they act as a unit when the spring has been tensioned a predetermined amount and thus relieve the spring of tortional strain and loads beyond the amount the spring is designed to carry.

1 and 2 designate respectively, the headers, and 3 the coiled spring fixed at its ends to the headers, the headers having means on which the spring expands and binds when tensioned a predetermined amount in one direction and also means on which the spring contracts and binds when torque is applied thereto in the opposite direction.

As here shown, the headers include sleeves 4, 5 encircling the coils of the spring, and plugs 6, 7 inserted in the end coils of the spring, the sleeves being shrunk on the end coils in order to securely fix the end coils to the headers and clamps such coils between the sleeves and the plugs. The portions of the sleeves 4 and 5 encircling the intermediate coils of the spring 3 are cut away to form a clearance at 8 to permit a limited expansion of the spring. The sleeves provided with this clearance at 8 constitute means against which the spring binds to limit the expansion thereof when it is tensioned in one direction. 9 is a sleeve which is cut spirally, this sleeve being floating and resting at its ends on the plugs 6, 7 and having sufficient clearance between its periphery and the intermediate coils of the spring 3 to permit the spring to contract a predetermined amount before binding thereon. This sleeve 9 constitutes means on which the springs 3 binds to limit the tensioning thereof in the opposite direction. The spring may be of any suitable form, size and construction and is preferably of the construction set forth in the application of Maxwell R. Karge, Sr. No. 364,712, filed March 10, 1920.

In the illustrated form of our invention, the headers also include end plates 10 and 11 secured to the sleeves 4, 5 respectively in any suitable manner as by screws 12 and provided with means as hubs 13, 14 for connection to the shaft sections to be coupled together. These plugs may be also connected together by a floating piece or loosely fitting mandrel 15.

As before stated, the headers comprise sleeve members 4, 5 and plug members 6, 7 and the means for connecting the headers together after the spring has been tensioned a predetermined amount, that is, after the tensioning thereof has been limited either by the sleeves 8 or 9, consists of interlocking means between one of said members of one coupling and the corresponding member of the other coupling.

In the illustrated form of our invention, this interlocking means is interposed between the sleeve members 4, 5 these sleeve members being provided with jaws on their opposing faces which jaws are normally spaced apart to provide a lost motion connection which is taken up after the spring has been tensioned in one direction or the other and, when taken up binds or couples the headers together whereby relative movement thereof is prevented and they act as a unit. As shown in Figs. 1 and 2, one of the sleeve members 4 is provided with a slot in the margin thereof, the intermediate portion of which opens through the edge of the sleeve providing claws 16 at opposite ends of the sleeves; and the other sleeve member 5 is a provided with a jaw or a pin 17 extending from the margin 18 thereof which margin laps the margin of the sleeve 4, the pin 17 normally standing intermediate of the ends of the slot and being movable into engagement with one end wall of the slot and behind one of the claws 16 after the spring has been tensioned in one direction or the other. Thus, when sufficient relative movement has taken place between the sleeves 4, 5 to take up the lost motion between the jaw or pin 17 and either end of the slot, the pin is also located behind one or the other of the claws 16. Hence, both relative rotary and endwise movement of the sleeves 4, 5 is prevented and the headers act as a unit and prevent the spring from being tensioned beyond the amount it is designed to carry.

As shown in Figs. 4, 5 these jaws are the ordinary form such as used in jaw clutches, the sleeve 4 being formed with a rectangular slot 20 opening through the edge face thereof opposed to the sleeve 5, and the sleeve 5 being formed with a rectangular jaw or projection 21 extending into the slot 20, it being smaller than the slot 20 in order to provide a lost motion.

Owing to the construction of this coupling expansion or contraction of the spring or driving coil beyond its elastic limit and also strain on the spring beyond its limit due to binding thereof, is prevented so that the coupling is unbreakable.

What we claim is:

1. A flexible coupling comprising a pair of headers having means for connection to shafts to be coupled together, and a coiled torsion spring fixed at its ends to the headers respectively, the headers including sleeve members encircling the coiled spring and plug members located within the spring, one of said members of each header being connected with the corresponding member of the other header by an interlocking lost motion connection, substantially as and for the purpose set forth.

2. A flexible coupling comprising a pair of headers having means for connection to shafts to be coupled together, and a coiled torsion spring fixed at its ends to the headers respectively, the headers including sleeve members encircling the coiled spring and plug members located within the spring, one of said members of each header being formed with a jaw for receiving a jaw on the corresponding member of the other header, the jaws being normally spaced apart to provide a lost motion which is taken up when the spring has been tensioned a predetermined amount, substantially as and for the purpose described.

4. A flexible coupling comprising a pair of headers having means for connection to shafts to be coupled together, and a coiled torsion spring fixed at its ends to the headers respectively, the headers including sleeve members encircling the coiled spring and plug members located within the spring, the sleeve members being formed with interlocking jaws on their opposing faces, the jaws being spaced apart in order to provide a lost motion which is taken up when the spring has been tensioned a predetermined amount, substantially as and for the purpose specified.

4. A flexible coupling or universal joint comprising opposing headers having means for connection to shaft sections, the headers including sleeves connected together by lost motion connection, a coiled torsion spring located within the sleeves and secured at its ends to the sleeves respectively, substantially as and for the purpose set forth.

5. A flexible coupling or universal joint comprising opposing headers having means for connection to shaft sections, the headers including sleeves connected together by a lost motion connection, a coiled torsion spring located within the sleeves and secured at its ends to the sleeves respectively, the portions of the sleeves enclosing the intermediate coils of the spring being spaced apart from the periphery of the spring to permit a limited expansion of the spring, substantially as and for the purpose described.

6. A flexible coupling comprising a pair of headers having means for connection to shafts to be coupled together, and a coiled torsion spring fixed at its ends to the headers respectively, the headers including sleeve members encircling the coiled spring and plug members located within the ends of the spring, one of said members of each header being formed with a slot for receiving a projection on the corresponding member of the other header, the end walls of the slot and the projection being normally spaced apart to provide a lost motion which is taken up when the spring has been tensioned a predetermined amount, substantially as and for the purpose specified.

7. A flexible coupling comprising a pair of headers having means for connection to shafts to be coupled together, and a coiled torsion spring fixed at its ends to the headers respectively, the headers including sleeve members encircling the coiled spring and plug members located within the ends of the spring, one of said members of each header being formed with a slot for receiving a projection on the corresponding member of the other header, the end walls of the slot and the projection being normally spaced apart to provide a lost motion which is taken up when the spring has been tensioned a predetermined amount, the slot being open at its intermediate portion through the end of the header providing claws at the ends of the slot and the projection being arranged to pass beyond one of the claws when the spring has been tensioned a predetermined amount in one direction, substantially as and for the purpose set forth.

In testimony whereof, we have hereunto signed our names hereto at Syracuse, in the county of Onondaga, and State of New York, on the 30th day of October, 1920, and the 17th day of September, 1920, respectively.

MAXWELL R. KARGE.
FERNAN O. CONILL.